3,210,289
ARSENATE AND PHOSPHATE PHOSPHORS
Eleswarapu C. Subbarao, Wilkins Township, Allegheny County, and Don E. Harrison, Wilkinsburg, Pa., assignors to Westinghouse Electric Corporation, Pittsburgh, Pa., a corporation of Pennsylvania
No Drawing. Filed Oct. 23, 1962, Ser. No. 232,617
10 Claims. (Cl. 252—301.4)

This invention relates to phosphor material and, more particularly, to improved phosphor material which either is self-activated or can be sensitized to produce a modified luminescence.

Phosphor materials are used in fluorescent lamps and other types of light sources for converting ultraviolet radiations into radiations which have a longer wavelength. More recently, phosphor materials had been suggested for use in conjunction with laser applications. While very many different phosphor materials are known, new phosphors which have modified emission spectra, different phosphorescent characteristics, and other varying performance characteristics are useful for general lighting or for special applications.

Phosphors which are self-activated and which also can be activated by impurity additions to modify the emission characteristics are especially useful, since the performance characteristics of a single matrix can be readily changed by the omission or inclusion of the sensitizing activator.

It is the general object of this invention to provide a new class of phosphor material which either is self-activated, or can be sensitized by the inclusion of impurity activator to produce a modified luminescence.

It is another object to provide specific phosphors falling within a class of new phosphor materials.

It is a further object to provide activator materials which can be used with a new class of host matrices or lattices, in order to provide phosphor materials having a modified emission.

The aforesaid objects of the invention, and other objects which will become apparent as the description proceeds, are achieved by providing a phosphor composition comprising either a lead titanate phosphate or a material having the formulation $M_2 \cdot Zr \cdot R_2O_9$, wherein M is barium, strontium, or bivalent lead, and R is pentavalent phosphorus or pentavalent arsenic. These phosphors are either self-activated or they can be activated by manganese, samarium, europium, neodymium, or dysprosium, in order to modify their luminescence characteristics.

Self-activated phosphors

The self-activated phosphors of the present invention include seven different embodiments, as follows: barium zirconium phosphate, strontium zirconium phosphate, lead zirconium phosphate, lead titanium phosphate, barium zirconium arsenate, lead zirconium arsenate, and strontium zirconium arsenate. Six of these phosphors have the same hexagonal crystal structure and the seventh, strontium zirconium arsenate, has optical properties closely related to the other six compounds. The phosphors can be briefly summarized by expressing their general formulation as $Pb_2 \cdot Ti \cdot P_2O_9$ or $M_2 \cdot Zr \cdot R_2O_9$, wherein M is barium, strontium, or bivalent lead, and wherein R is pentavalent phosphorus or pentavalent arsenic.

As a specific example for preparing the foregoing phosphors, two mols of strontium carbonate are mixed with one mol of zirconium oxide and two mols of ammonium dihydrogen orthophosphate. The foregoing constituents are mixed by grinding in a mortar with sufficient acetone to form a slurry. The acetone is evaporated, and the dry mix is fired in air at a temperature of about 600° C. for at least 4 hours, and preferably about 12 hours, to fix the phosphate by reaction with the strontium compound. Thereafter, the resulting material is reduced to finely divided status, and the phosphor is formed by firing in air at a temperature of 1100° C. for at least about 4 hours.

In the foregoing example, barium carbonate or lead carbonate can be substituted in equivalent molar proportions for the strontium carbonate. When producing the arsenate modifications of the present phosphors, one mol of arsenic pentoxide is substituted for the orthophosphate in the foregoing example. The other preparation techniques are similar to those as given.

When forming the lead titanate phosphate phosphor, the zirconium dioxide in the foregoing example is replaced with an equivalent amount of titanium dioxide, and the preparation procedures are generally similar, except that the final firing temperature is 900°C. in air for a period of at least about 4 hours.

As a modified procedure for preparing the foregoing phosphors, two mols of strontium nitrate are mixed with one mol of zirconyl chloride and two mols of phosphoric acid. Sufficient water is included to form a slurry, and the slurry is allowed to set overnight to form a gel. The gel is dried by heating at a temperature of about 400° C. for about 2 hours. Thereafter, the dried material is fired as in the previous example, in order to form the phosphor.

Under excitation by 2537 A.U. radiations, all of the foregoing phosphors fluoresce with a blue color except the lead titanium phosphate which fluoresces with a yellow color. The room temperature fluorescence of the lead-containing embodiments are not as good as the room temperature fluorescence of the strontium- and barium-containing embodiments. At very low temperatures, however, the fluorescence of the lead-containing phosphor embodiments is much improved. All of these phosphors display a long phosphorescence decay.

Sensitized luminescence

The foregoing phosphors are also useful as host matrices, whereby a non-stoichiometric amount of impurity activator is introduced into the matrices, in order to modify the luminescence characteristics. As an example, any of the foregoing host matrices can be activated by manganese, samarium, europium, neodymium, dysprosium, or mixtures thereof. This produces varying results depending upon the activator and the specific host matrix used. For example, strontium zirconium phosphate or lead zirconium phosphate when activated by samarium respond with an orange emission when excited by 3650 A.U. excitation. Strontium zirconium phosphate or lead zirconium phosphate when activated by europium respond with a red emission when excited with either 2537 A.U. or 3650 A.U. excitation. Strontium zirconium phosphate or lead zirconium phosphate when activated by neodymium respond with an infra-red emission when excited by 3650 A.U. excitation. Strontium zirconium phosphate or lead zirconium phosphate when activated by dysprosium respond with a whitish emission when activated by 3650 A.U. excitation. A manganese activator produces a red-orange emission. In all cases, the emission is shifted toward the longer wavelengths, with the amount of shift depending upon the activator and the host matrix.

The concentration for any of the foregoing activators is not particularly critical and, as an example, can vary over a wide range such as from 0.25 gram-atom percent up to fifteen gram-atom precent. The preferred activator range is from one gram-atom percent to ten gram-atom percent, with the activator concentration calculated with respect to the host matrix considered as a molar unit.

As a specific example for preparing an activated phosphor material, 1.96 mols of strontium carbonate are mixed with 0.04 mol of europium chloride, one mol of zirconium dioxide, and two mols of ammonium di-hydrogen orthophosphate. The firing conditions are similar to those used in preparing the self-activated material. For preparing the phosphors which incorporate the other indicated activator materials, any of these can be substituted as the chloride in equivalent molar amounts for the europium chloride in the foregoing example. Similarly, barium or lead can be substituted in similar molar proportions for the strontium carbonate, and arsenic pentoxide can be substituted for the ammonium di-hydrogen orthophosphate in the foregoing example, maintaining the gram atoms of arsenic and phosphorus the same. As in the case of the self-activated embodiments, the firing temperatures and other preparation techniques are the same except for the lead titanium phosphate, wherein the firing temperature is 900° C. The activator materials can also be mixed in any proportions, preferably maintaining the total activator concentration within the foregoing specified ranges.

As a possible alternative embodiment, any of the foregoing phosphors can be mixed in any proportions to modify the resulting emission. When the firing temperatures are the same, the raw materials comprising the different phosphor embodiments as described herein can be mixed to produce, after firing, a mixture of phosphors.

It will be recognized that the objects of the invention have been achieved by providing a phosphor material which is either self-activated or which can serve as a host lattice for sensitizing impurities in order to modify the emission characteristics of the phosphor. Various phosphor embodiments within the general disclosed class of phosphors have also been provided.

While best embodiments of the invention have been illustrated and described in detail, it is to be particularly understood that the invention is not limited thereto or thereby.

We claim as our invention:

1. A phosphor composition consisting essentially of a material of the group consisting of $Pb_2 \cdot Ti \cdot P_2O_9$ and $M_2 \cdot Zr \cdot R_2O_9$, wherein M is one of the group consisting of barium, strontium, and bivalent lead, and R is one of the group consisting of pentavalent phosphorus and pentavalent arsenic.

2. A phosphor composition having a host matrix of the group consisting of $Pb_2 \cdot Ti \cdot P_2O_9$ and $M_2 \cdot Zr \cdot R_2O_9$, wherein M is one of the group consisting of barium, strontium, and bivalent lead, and R is one of the group consisting of pentavalent phosphorus and pentavalent arsenic, and said host matrix is activated by from 0.25 to fifteen gram-atom percent of at least one of the group consisting of manganese, samarium, europium, neodymium and dysprosium.

3. A phosphor composition having a host matrix of the group consisting of $Pb_2 \cdot Ti \cdot P_2O_9$ and $M_2 \cdot Zr \cdot R_2O_9$, wherein M is one of the group consisting of barium, strontium, and bivalent lead, and R is one of the group consisting of pentavalent phosphorus and pentavalent arsenic, and said host matrix is activated by from one gram-atom percent to ten gram-atom percent of at least one of the group consisting of manganese, samarium, europium, neodymium, and dysprosium.

4. A phosphor composition which can serve both as a self-activated phosphor and as a host matrix for sensitized luminescence, said phosphor composition consisting essentially of $Ba_2 \cdot Zr \cdot P_2O_9$.

5. A phosphor composition which can serve both as a self-activated phosphor and as a host matrix for sensitized luminescence, said phosphor composition consisting essentially of $Sr_2 \cdot Zr \cdot P_2O_9$.

6. A phosphor composition which can serve both as a self-activated phosphor and as a host matrix for sensitized luminescence, said phosphor composition consisting essentially of $Pb_2 \cdot Zr \cdot P_2O_9$.

7. A phosphor composition which can serve both as a self-activated phosphor and as a host matrix for sensitized luminescence, said phosphor composition consisting essentially of $Pb_2 \cdot Ti \cdot P_2O_9$.

8. A phosphor composition which can serve both as a self-activated phosphor and as a host matrix for sensitized luminescence, said phosphor composition consisting essentially of $Ba_2 \cdot Zr \cdot As_2O_9$.

9. A phosphor composition which can serve both as a self-activated phosphor and as a host matrix for sensitized luminescence, said phosphor composition consisting essentially of $Pb_2 \cdot Zr \cdot As_2O_9$.

10. A phosphor composition which can serve both as a self-activated phosphor and as a host matrix for sensitized luminescence, said phosphor composition consisting essentially of $Sr_2 \cdot Zr \cdot As_2O_9$.

References Cited by the Examiner

UNITED STATES PATENTS

| | | | |
|---|---|---|---|
| 2,901,436 | 8/59 | Klasens | 252—301.4 |
| 3,017,365 | 1/62 | Harrison | 252—301.4 |

OTHER REFERENCES

Henderson et al.: "Barium Titanium Phosphate: A New Phosphor," Journal of The Electrochemical Society, December 1951, volume 98, No. 12, pages 479–482.

TOBIAS E. LEVOW, *Primary Examiner.*

MAURICE A. BRINDISI, *Examiner.*